(12) United States Patent
Staten et al.

(10) Patent No.: US 12,354,565 B2
(45) Date of Patent: Jul. 8, 2025

(54) DISPLAY CALIBRATION AND COLOR PRESET GENERATION

(71) Applicant: Hewlett-Packard Development Company, L.P., Spring, TX (US)

(72) Inventors: Gregory Staten, Spring, TX (US); Alexander Morgan Williams, Spring, TX (US); Yi-Yang Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/560,612

(22) PCT Filed: May 20, 2021

(86) PCT No.: PCT/US2021/033364
§ 371 (c)(1),
(2) Date: Nov. 13, 2023

(87) PCT Pub. No.: WO2022/245355
PCT Pub. Date: Nov. 24, 2022

(65) Prior Publication Data
US 2024/0257777 A1    Aug. 1, 2024

(51) Int. Cl.
*G09G 3/36* (2006.01)
*G09G 5/06* (2006.01)
*H04N 9/73* (2023.01)

(52) U.S. Cl.
CPC ............ *G09G 3/3607* (2013.01); *G09G 5/06* (2013.01); *H04N 9/73* (2013.01); *G09G 2320/0276* (2013.01); *G09G 2320/0673* (2013.01); *G09G 2320/0693* (2013.01)

(58) Field of Classification Search
CPC ............... G09G 3/3607; G09G 5/06; G09G 2320/0276; G09G 2320/0673; G09G 2320/0693; G09G 3/2003; G09G 2320/08; G09G 2340/06; H04N 9/73
See application file for complete search history.

(56) References Cited

U.S. PATENT DOCUMENTS

| | | | |
|---|---|---|---|
| 10,911,748 B1 * | 2/2021 | Molholm | H04N 17/04 |
| 2002/0180750 A1 | 12/2002 | Rozzi | |
| 2006/0007240 A1 * | 1/2006 | Herbert | G06F 3/1446 |
| | | | 345/591 |
| 2010/0302273 A1 * | 12/2010 | Myers | G09G 3/3607 |
| | | | 345/593 |

(Continued)

FOREIGN PATENT DOCUMENTS

EP        2940898 B1    8/2018

*Primary Examiner* — Ibrahim A Khan
(74) *Attorney, Agent, or Firm* — Quarles & Brady LLP

(57) ABSTRACT

In one example in accordance with the present disclosure, an electronic device is described. An example electronic device includes a calibration engine to receive display calibration measurement data generated by a calibration device for a display device. The example calibration engine is to determine a calibrated color profile to cause the display device to operate according to a baseline light condition based on the display calibration measurement data. The example electronic device also includes a color preset engine to generate a color preset for the display device based on the baseline light condition.

16 Claims, 8 Drawing Sheets

(56) References Cited

U.S. PATENT DOCUMENTS

| | | | |
|---|---|---|---|
| 2014/0072189 A1* | 3/2014 | Jena | A61B 5/6898 |
| | | | 382/128 |
| 2014/0111505 A1* | 4/2014 | Hayashi | H04N 1/6033 |
| | | | 345/214 |
| 2016/0086583 A1 | 3/2016 | Oshima et al. | |
| 2016/0300527 A1* | 10/2016 | Piper | G09G 3/3233 |
| 2017/0032742 A1* | 2/2017 | Piper | G09G 3/3233 |
| 2017/0085895 A1* | 3/2017 | Gu | H04N 19/46 |
| 2017/0186141 A1* | 6/2017 | Ha | H04N 9/67 |
| 2019/0251929 A1* | 8/2019 | Fossati | G01J 3/463 |
| 2020/0082785 A1* | 3/2020 | Woodall | G09G 5/02 |
| 2020/0380907 A1* | 12/2020 | Marcu | G09G 3/2003 |

* cited by examiner

DISPLAY CALIBRATION AND COLOR PRESET GENERATION

BACKGROUND

Images are processed for use with computing machines, such as a display device or a print apparatus. A display device, for example, may produce a visual representation of an image by operating light-emissive circuitry represented as a number of pixels based on processed image data. A display device may provide a certain range of colors producible by the number of pixels.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
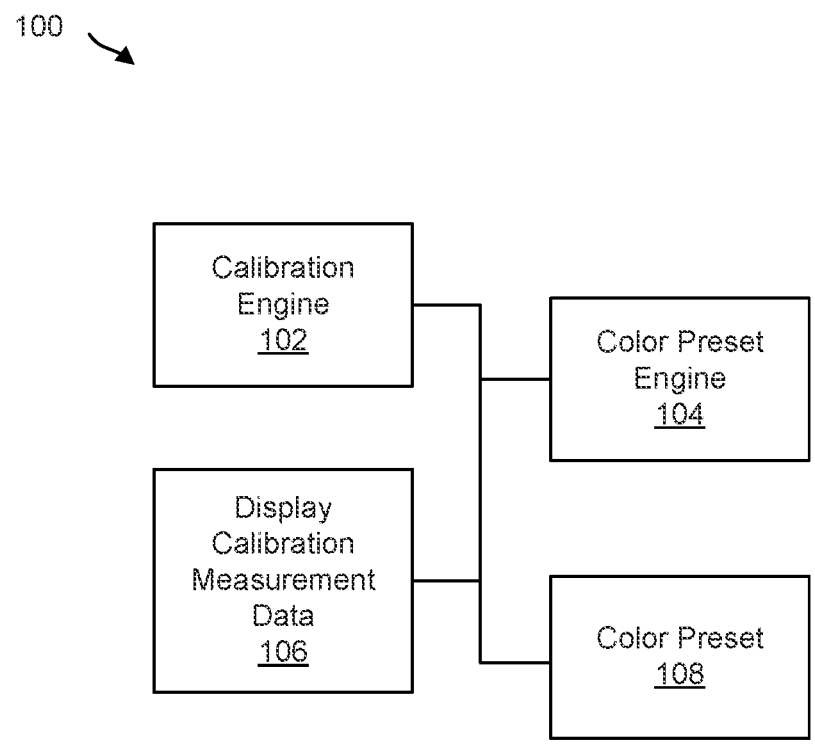
FIG. 1 is a block diagram of an electronic device to perform display calibration and color preset generation, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the following description and figures, some example implementations of display apparatus, display systems, and/or methods of calibrating a display device are described. A display device presents (e.g., displays) an image on a panel using color data (e.g., such as red, green, and blue (RGB) channel data) to determine a color to display for every pixel on the panel. Colors displayed by a panel may be dependent on the color characteristics of the display panel. For liquid crystal display (LCD) panels, color characteristic information may include spectral output of the backlight and the tone of the color filters applied on the top of the grayscale liquid crystals. These characteristics differ from panel to panel, resulting in colors often looking very different on one computer monitor or television as compared to another.

To address this inconsistency, a display device can be calibrated to result in a consistent, predictable color response. Some displays may be calibrated in the factory and some displays also support recalibration by the user. User calibration may allow a user to adjust the default display color configuration to achieve a particular desired appearance. As examples, the white point (color of white) may be changed to a certain value, the electro-optical transfer function (EOTF) (also referred to as grayscale response) may be adjusted to the ambient lighting in the environment of the display device, or a color configuration may be generated that matches the color configuration of a different device, such as a mobile phone.

In some examples, in order to calibrate a display, a calibration device (such as a tristimulus colorimeter or spectroradiometer) may be placed in front of the screen while color patterns are generated on the display panel. The calibration device may read and record measurements of the screen at the time of the color pattern. These measurements provide a characterization of the display panel's performance, such as in the form of tuple sets. An example tuple set may be a color value for one of each color channel. The example tuple may be comparable to the color input tuple used when generating a corresponding measurement pattern. For example, the display calibration measurement data may be stored as an RGB triplet or an XYZ tristimulus output value. Indeed, the display calibration measurement data may be represented by a set of tristimulus values and a set of measured output tristimulus values for each input value corresponding to a specific output value.

After a sufficient number of calibration measurements are made, the display calibration measurement data may be processed, and a calibrated color profile is generated. For example, the display may be measured in percentile linear or non-linear steps, such as at 100% of the color channel values, 80% of the color channel values, 60%, etc. The target gamut of the desired display characteristics may be calculated from the measurement data and those calculations may be represented in a data structure, such as a look up table (LUT) and/or matrix in a calibrated color profile. A calibrated color profile defines how a display device's hardware is to operate in a color space (e.g., a range of colors defined by a triangular intersection of the three additive color primaries). The calibrated color profile may define a gamut, a white point, and a luminance. In some examples, a calibrated color profile may include a one dimensional (1D) LUT, three-dimensional (3D) LUTs and/or a matrix multiplier. In some examples, the calibrated color profile may take the form of a pre-lookup-table (Pre-LUT), a multiply matrix (e.g., a 3×3 matrix), and/or a post-LUT. In other examples, the calibrated color profile may take the form of a shaper LUT followed by a three-dimensional (3D) LUT. A calibrated color profile may constrain the display device to operate in a standard color space or in a customized color space.

In some approaches, display devices have an architecture that combines calibration and color preset generation. In these approaches, in order for a new color-accurate calibrated color preset to be created, new measurements are made front-of-screen on a display device. A new color preset is then generated from these measurements. In these approaches, if three color presets are to be calibrated, then three sets of measurements are made. This is due to architectural limitations in display firmware and scaler design. If an IT engineer is working on a deployment configuration for a display device, then the IT engineer may find themselves recalibrating dozens of times just to fine tune the final preset configuration. As each calibration pass may take 15 minutes or more, this is a time-consuming process, especially as front-of-screen evaluations and measurements are taken after each calibration.

In addition, to provide user flexibility, according to some approaches, a fixed number of calibrated color presets may be present on a display device. For example, to ensure that a display device covers as wide a number of possible user workflows, a display device may ship with as many as eight color presets, even though any individual user may only ever use one or two of the color presets.

This disclosure addresses these scenarios by separating the process of front-of-screen measurements and calibration from the generation of color presets. Thus, present specification describes dynamic color preset generation separated from display device measurement and calibration. In some examples, the process of display measurement and calibration is separated from the generation of color presets. In some example approaches, the color presets may be dynamically generated or modified without making new front-of-screen measurements of the display device. In another aspect, because the measurement and calibration of the display device is its own separate process, the measurement and calibration process can run on its own schedule without impacting the color presets. Thus, user-created presets may be generated or adjusted separate from the measurement and calibration process. Third, this disclosure describes examples of a dynamic list of color presets that may include as few or as many color presets as desired to facilitate a user's workflow.

In some examples, the generated color presets may have unique names, RGB primaries, white point, EOTF, luminance, etc. The calibration process may run on its own definable schedule (such as every thousand hours of display device use, every six weeks, and so on) while color preset generation may be performed dynamically. In some examples, a desired number of color presets for a user's workflow configuration may be made available on a display device, thus reducing user confusion and the risk that a user (e.g., a freelance artist) may select the wrong color preset.

As mentioned, the process of display measurement and calibration, where multiple color patterns are generated onscreen and the output measured by an external measurement instrument (e.g., colorimeter or spectroradiometer), is to be treated as a separate process from generating color presets for a display device. The display calibration measurement data may be used to characterize a panel's output and to generate compensation LUTs to create a linear light condition within the display device.

As used herein, a linear light condition is a state of the display device in which the image signal is not gamma corrected. This results in image processing calculations at the display device that can be done using linear math. It should be noted that the human eye does not perceive light linearly. Therefore, gamma correction may be applied to capture, generate, and/or display an image so that the image is seen correctly by the human eye. In an example, in photography a device called an 18% gray card is designed to reflect 18% of the available light back to the viewer. However, that 18% gray value in linear light is equivalent to 50% of the luminance range of a standard dynamic range video.

Therefore, gamma correction is applied to images when they are captured, generated, and output. These gamma corrections may be referred to as the OETF (optical-electro transfer function) on an image capturing device (e.g., a camera) and the EOTF (electro-optical transfer function) on a display device.

Taking a look momentarily at a computer-based image compositing system, gamma-corrected input images may be converted into a linear light condition by performing an inverse gamma correction. When in the linear light condition, the input images may be processed efficiently and advanced adjustments may be made to the image.

In a display device with a color pipeline, the image may be converted to linear light for processing via the application of a specific EETF (electro-electro transfer function) that matches the EOTF applied to the source image by the signal generator. After processing, an EOTF is then applied to restore the image to the desired non-linear gamma corrected mode for proper display and viewing by the human eye.

Converting the display device to a linear light condition may reverse the gamma-correction process. In some examples, the display device may include an EOTF (e.g., a Power 2.2 gamma EOTF) to perform gamma correction. A display device may also have its own inconsistencies in the output of the image due to the limits of the technology. Taking the display device to a linear light condition includes measuring the display output during calibration and generating a set of LUTs that convert the display device to a linear output device. Through this process, the gamma EOTF included into the display device is inverted and any nonlinearities in the display device output may be corrected.

The calibration process, therefore, generates the LUTs to put the display device into the linear light condition. Then, color presets may be applied to the linear light condition. As used herein, a color preset is a display configuration with a specific white point, set of RGB primaries, an EOTF and/or a specific front-of-screen luminance. For standard dynamic range (SDR) display devices, a color preset may also include a front-of-screen peak white luminance. As the display calibration process creates a linear light condition, additional LUTs may be generated to change the front-of-screen output to reflect the desired display conditions. Because the target of the calibration process is a linear light condition, calibration can operate independently of other operations in the display without risk of corrupting or negatively influencing the individual color preset definitions, as the color presets may be mapped on top of the calibrated linear light condition.

The preset specification further describes examples to generate and adjust multiple color presets. In some examples, a human-readable file format may be used to generate or adjust multiple color presets. In an example, an extensible markup language (XML) schema, or other human-readable format (e.g., VCP), may be used to generate or adjust multiple presets in a display device. This schema may define all of the color presets that will be available to the user. In some examples, the color presets may be available either via the on-screen display (OSD) or through a host-based display control application. The interface complexity may be controlled by defining all of the color presets available on a display device. While each display device may have a maximum potential number of color presets, an administrative user (e.g., IT engineer, facility administrator, etc.) may choose to expose a subset of the color presets, including as few as one preset, to simplify deployment and to ensure that an end user (e.g., a graphic artist) uses the correct color preset. Therefore, the number of color presets 108 may be dynamic and not fixed.

In some examples, the ability to provide multiple display devices with a common set of color presets may be useful for organizations where consistent display appearance is expected. For example, a studio may include multiple users (e.g., video editors, graphic designers, colorists, visual effects artists/animators, web designers, etc.) that may collaborate on a common graphic project. In this case, the users may expect that an image will appear the same on each display device used throughout the studio. Thus, the examples described herein for generating color presets for use across multiple display devices without having to recalibrate each display device may be useful to ensure consistency in the appearance of displayed images across an organization.

As used in the present specification and in the appended claims, the term "processor" or "processor resource" may be a controller, an application-specific integrated circuit (ASIC), a semiconductor-based microprocessor, a central processing unit (CPU), and a field-programmable gate array (FPGA), and/or other hardware device.

As used in the present specification and in the appended claims, the term "memory" or "memory resource" may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement the functionality described herein.

Various examples described below relate to separate processes for calibrating a display device and generating color presets. Turning now to the figures, FIG. 1 is a block diagram of an electronic device 100 to perform display calibration and color preset generation, according to an example. The example electronic device 100 may include a calibration engine 102 and a color preset engine 104. In general, the calibration engine 102 may receive display calibration measurement data 106 generated by a calibration device for a display device. The calibration engine 102 may determine a calibrated color profile to cause the display device to operate according to a baseline light condition. The color preset engine 104 may generate a color preset 108 for the display device based on the baseline light condition. In some examples, the baseline light condition may be a linear light condition for the display device.

The calibration engine 102 represents any circuitry or a combination of circuitry and executable instructions to receive display calibration measurement data 106 generated by a calibration device for a display device. For example, the calibration engine 102 may receive display calibration measurement data 106 from a calibration device (such as a colorimeter or spectroradiometer) that measures light emitted at the front the display device screen. In some examples, the calibration device may be external to the display device. In some examples, the calibration device may be a sensor included in the display device.

The display calibration measurement data 106 may characterize the performance of the display panel of the display device. Display calibration measurement data, as used herein, refers to measurement data taken by a calibration device during a calibration operation. In some examples, the calibration operation may be performed at a manufacturing facility or other factory stage before shipping to an end user. In some examples, display calibration measurement data may be obtained through user calibration via a calibration instrument, such as when a user attached a personal colorimeter to the display to perform a calibration operation to obtain the display calibration measurement data 106. In some examples, the display calibration measurement data 106 is a representation of values measured from a display panel. The display calibration measurement data 106 may be represented or otherwise converted and still directly represent the measurement results. In some examples, the display calibration measurement data 106 may be obtained by connecting the calibration device and making front-of-screen (FOS) measurements of a collection of color patterns displayed by the display panel.

The calibration engine 102 also represents any circuitry or a combination of circuitry and executable instructions to determine a calibrated color profile to cause the display device to operate according to a baseline light condition. For example, the calibration engine 102 may calculate corrections to account for display panel inconsistencies. The calibration engine 102 may generate and upload LUTs to cause the display device to operate according to a baseline light condition. In some examples, the baseline light condition may be a linear light condition. This linear light condition may also be referred to as a neutral configuration of the display device.

It should be noted that the calibration of the display device is independent of color preset generation. In other words, the display device may be calibrated without generating or adjusting a color preset 108. In some examples, the calibration may be schedulable or may be on demand. For example, the calibration of a display device may be remotely schedulable. In some examples, the calibration may be run on a display device using an internal sensor or a connected calibration device. Because the calibration is independent of color preset generation, the calibration may take a specific amount of time, regardless of the number of color presets 108.

The color preset engine 104 represents any circuitry or a combination of circuitry and executable instructions to generate a color preset 108 for the display device based on the baseline light condition. In some examples, the color preset engine 104 may determine display parameters for the color preset 108. For example, the display parameters for the color preset 108 may include a specific white point, a set of RGB primaries, an electro-optical transfer function (EOTF) and/or a specific front-of-screen luminance. In some examples, the display parameters may further include a luminance value, a tone value for a color channel, a range of tone values defining a gamut, a white balance value, a grayscale response value corresponding to all color channels, an optical-electrical transfer function (OETF), an electrical-electrical transfer function (EETF), and/or an inverse-EOTF. When the color preset 108 is selected, a display device is to operate according to the display parameters.

In some examples, the color preset engine 104 is to determine a color preset mapping to convert the baseline light condition to meet the display parameters for the color preset. For example, the color preset mapping may convert the linear light condition set during calibration to the display parameters. Therefore, upon applying the color preset 108 in a display device, the display device may convert the linear light condition to the target display parameters.

The color preset 108 may cause a color pipeline of a display device to be changed. In some examples, the color preset mapping may include a lookup table (LUT) or a set of lookup tables. Thus, in an example, the generated color preset 108 may be a color pipeline configuration having an LUT or multiple LUTs representing color corrections between the baseline light condition and the display parameters. Upon loading the LUT or multiple LUTs of the color preset 108, a display device may adjust the output of the display to meet the display parameters. The color preset LUTs may map the baseline light condition (e.g., the linear light condition) to the target display parameters of the color preset 108. Because the calibrated baseline light condition is a linear light condition, calibration can operate independently of the color preset 108 generation. Calibration of a display device may occur without risk of corrupting or negatively influencing the color preset 108 as the color preset 108 is mapped on top of the calibrated linear light condition.

In some examples, the color preset engine 104 may generate a set of color presets 108 to cause the display device to meet the display parameters based on the calibrated linear light condition. The set of color presets 108 may include a user-configurable number of color presets 108. For example, a user may choose to generate one color presets 108, two color presets 108, and so forth. Each color preset 108 may have a unique set of display parameters. For example a first color preset 108 may have a first set of display parameters, a second color preset 108 may have a second set of display parameters, and so forth.

In some examples, the color preset engine 104 may generate color presets 108 for a certain type of display environment or type of user work. For example, the color preset engine 104 may provide an option in the display where a user can select the type of work they do (e.g., graphic arts, photography, video editing, etc.). The color preset engine 104 may automatically generate a set of color presets 108 that match the user selection.

In some examples, color presets 108 may be formatted in a human-readable file format. For example, a schema (e.g., an XML schema) may be created that can be used to generate or adjust multiple color presets 108 in a display device. This schema may define the color presets 108 that will be available to the user (e.g., either via the OSD or a host-based display control application). The display device interface complexity may be controlled by including all of the color presets 108 for a display device in the schema. In an example, while each display device may have a maximum potential number of color presets 108, an organization (e.g., a facility, studio, etc.) may choose to expose a subset of color presets 108, including as few as one color preset 108, to simplify deployment and ensure that users use the correct color preset 108. An example of an XML schema to generate or adjust color presets 108 is shown in Table-1 below.

TABLE 1

```
<schema>
<preset entries="3">
<preset_info>
<preset num="0" name="BBS P3"/>
<eotf value="2.4"/>
<colorimetry rx="0.680" ry="0.320" gx="0.265" gy="0.690" bx="0.150"
by="0.060" wx="0.3127" wy="0.329" wY="100"/>
</preset_info>
<preset_info>
<preset num="1" name="BBS 709"/>
<eotf value="BT1886"/>
<colorimetry rx="0.640" ry="0.330" gx="0.300" gy="0.600" bx="0.150"
by="0.060" wx="0.3127" wy="0.329" wY="100"/>
</preset_info>
<preset_info>
<preset num="2" name="BBS HDR 2020"/>
<eotf value="2084PQ"/>
<colorimetry rx="0.708" ry="0.292" gx="0.170" gy="0.797" bx="0.131"
by="0.046" wx="0.3127" wy="0.329"/>
</preset_info>
</preset>
</schema>
```

In Table-1, the term "preset entries" defines the number of color presets 108. In this example, three color presets 108 are specified. In Table-1, "preset num" is the index number for a color preset 108. The term "name" is used to give a color preset 108 a unique name. The terms "eotf value" and "colorimetry" define the display parameters for a given color preset 108.

In some examples, the color preset engine 104 may send a color preset 108 or set of color presets 108 to a display device. In some examples, a schema defining the color preset 108 may be directly loaded into a display device via a port (e.g., a USB port) on the display device. In some examples, the schema may be deployed to a display device or multiple display devices remotely via a host-based display control application. In some examples, the color preset engine 104 may receive an acknowledgement from the display device in response to the display device applying the set of color presets 108.

In some examples, the file containing the display parameters for the color presets 108 may be encrypted and/or signed with a cryptographic key prior to being sent to the display device. By encrypting the color preset file, an organization may protect proprietary information included in the color preset file. Furthermore, the cryptographic key may be used to provide security in the color preset file.

The described abstraction of the color preset generation from calibration also allows a user to easily generate or adjust the color presets 108 via a host-based application. For example, using a host-based application, a user may select display parameters for a given color preset 108. The host-based application may then push the defined color presets 108 (e.g., as an XML file, VCP file, etc.) to a display device without having to make measurements with an external calibration device.

In some examples, a user interface in the host-based application, may allow users to easily change the color presets 108. For example, a user may modify existing configurations of color presets 108. A user may add or remove color presets 108 or may start with a default number and state of color presets 108. A user may also save the display parameters for the color presets 108 to a file for deployment to other display devices.

In the described examples, by abstracting display measurement and color calibration from the color preset generation, the user experience may be simplified. For example, a user may quickly and freely experiment with color configurations without having to repeatedly calibrate the display device in a reduced lighting environment. Furthermore, an IT engineer or color scientist who is preparing display devices for facility-wide deployment may adjust the display to their facility and/or job conditions. New color presets 108 may be quickly created and pushed out to multiple display devices without performing an immediate recalibration with measurements. Also, the color preset generation may be performed at any time without making calibration measurements of a display device.

Having a single calibration process to set the display device in a linear light configuration results in a calibration that takes the same amount of time, regardless of how many color presets 108 are in use. This compares to other approaches where calibration is performed for each color preset 108. In these approaches, if there are four or more color presets 108 to calibrate, it may take multiple hours per display device. Thus, the described examples shorten downtime when the user is calibrating the display device.

By providing a clean and intuitive host-based interface for preset creation and manipulation of color presets 108, an individual user (e.g., IT engineer) may generate or adjust the color presets 108 desired on a display device as well as quickly deploy the color presets 108 to a single display device or a fleet of display devices.

In some examples, the calibration engine 102 and/or the color preset engine 104 may be implemented on an image processor. An image processor represents any circuitry or combination of circuitry and executable instructions to operate a display device. For example, an image processor may be circuitry to perform processing operations on image data, such as video data, and cause the processed data to present on a screen of a display device. Examples of an image processor include a video processor, a graphics processing unit (GPU), a scaler, a field-programmable gate array (FPGA), and the like. A scaler, as used herein, is circuitry of a display device that performs scaling of visual output from a host device to the size of the screen of the display device and operates the display device to present the visual output. For example, a scaler may perform image processing operations (such as converting video signal from one display resolution to another) and electrical control operations to coordinate emission of light from pixels to generate a perception of color. In this manner, the image processor may include a processor resource with a specific control program to perform video processing operations, including scaling operations and color preset generation operations.

In some examples, the calibration engine 102 and/or the color preset engine 104 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

Figure 2:
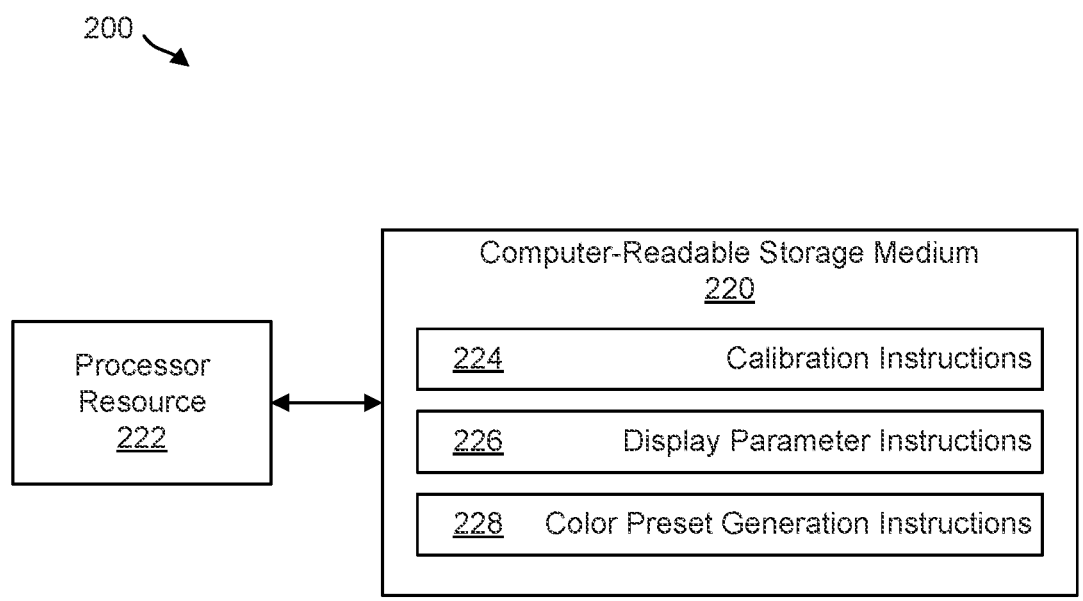
FIG. 2 depicts a system with a non-transitory computer-readable storage medium and processor resource, according to an example.

FIG. 2 depicts a system 200 with a non-transitory computer-readable storage medium 220 and processor resource 222, according to an example. To achieve its desired functionality, the system 200 includes various hardware components. Specifically, the system 200 includes a processor resource 222 and a computer-readable storage medium 220. The computer-readable storage medium 220 is communicatively coupled to the processor resource 222.

The computer-readable storage medium 220 includes a number of instructions 224, 226, 228 for performing a designated function. The computer-readable storage medium 220 causes the processor resource 222 to execute the designated function of the instructions 224, 226, 228. The computer-readable storage medium 220 can store data, programs, instructions, or any other computer-readable data that can be utilized to operate the system 200. In some examples, the system 200 may be implemented on the electronic device 100 of FIG. 1. For example, the computer-readable storage medium 220 can store computer-readable instructions that the calibration engine 102 and/or color preset engine 104 of the electronic device 100 can process or execute.

The computer-readable storage medium 220 can be an electronic, magnetic, optical, or other physical storage device that contains or stores executable instructions. Computer-readable storage medium 220 may be, for example, Random Access Memory (RAM), an Electrically Erasable Programmable Read-Only Memory (EEPROM), a storage device, an optical disc, etc. The computer-readable storage medium 220 may be a non-transitory computer-readable storage medium 220, where the term "non-transitory" does not encompass transitory propagating signals.

Referring to FIG. 2, calibration instructions 224, when executed by the processor, cause the processor resource 222 to calibrate a display device to operate according to a linear light condition. Display parameter instructions 226, when executed by the processor resource 222, may cause the processor resource 222 to determine display parameters for a color preset. In some examples, the display parameter instructions 226 may cause the processor resource 222 to determine display parameters for multiple color presets. For example, each color preset may include a unique set of display parameters.

Color preset generation instructions 228, when executed by the processor resource 222, may cause the processor resource 222 to generate the color preset to cause the display device to meet the display parameters based on the linear light condition. For example, the processor resource 222 may determine a color preset mapping to convert the linear light condition of the display device to meet the display parameters for the color preset. In some examples, the mapping may include a single LUT or multiple LUTs to convert the linear light condition to the display parameters of the color preset.

In the case of multiple color presets, the processor resource 222 may generate the multiple color presets to cause the display device to meet the display parameters for the multiple color presets based on the linear light condition. For example, the processor resource 222 may generate a LUT or multiple LUTs for each color preset to convert the linear light condition to the display parameters of the color presets.

It should be noted that the calibration of the display device is independent of color preset generation. For example, the processor resource 222 may receive display calibration measurement data from a calibration device. The processor resource 222 may then calibrate the calibrate the display device to operate according to a linear light condition. This calibration may be performed without changing the color presets. Furthermore, the color presets may be generated or adjusted without performing a measurement, calibration or recalibration of the display device.

Figure 3:
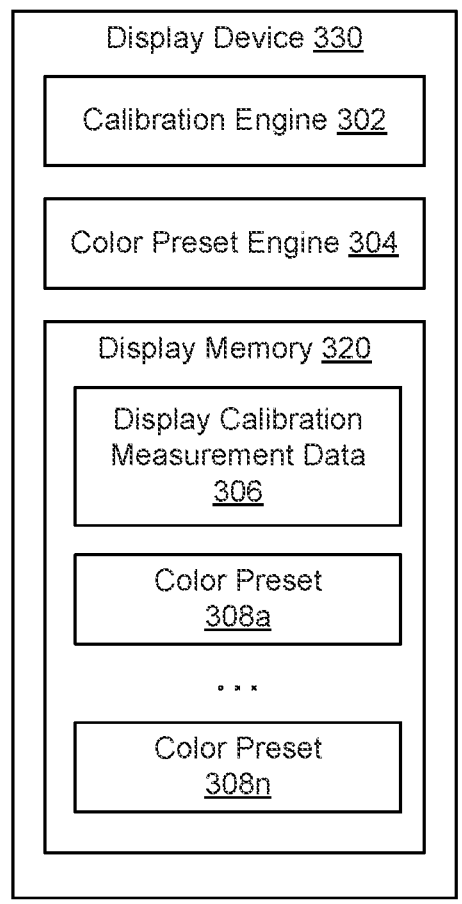
FIG. 3 is a block diagram of a display device to perform display calibration and color preset generation, according to an example.

FIG. 3 is a block diagram of a display device 330 to perform display calibration and color preset generation, according to an example. In this example, display device 330 may be a standalone display. In other examples, the display device 330 may be integrated in a computing device (e.g., laptop computer, tablet computer, etc.).

The display device 330 may include logic (such as a calibration engine 302 and a color preset engine 304 that are the same as the calibration engine 102 and the color preset engine 104 of FIG. 1) and display memory 320. The display logic may take various forms, such as a timing controller (TCON), a scaler chip or controller, a FPGA, and/or an ASIC. The display memory 320 may take various forms as well, such as those previously mentioned, as well as EEPROM, flash memory, etc.

The display memory 320 may store display calibration measurement data 306. The display memory 320 may store a plurality of color presets 308a-n. In various implementations, a memory of a display device may be used to store multiple color presets 308a-n that correspond to a plurality of display parameters. In some examples, the logic (e.g., calibration engine 302 and color preset engine 304) and display memory 320 of the display device 330 may be implemented as a system-on-chip (SoC).

In various examples, the display logic may receive, e.g., based on a signal received from a calibration device, the display calibration measurement data 306. Using the display calibration measurement data 306, the display logic may determine an adjustment to the display device 330 to operate the display device 330 according to a baseline light condition (e.g., linear light condition). Separate from the calibration process, the display logic may generate the color presets 308a-n for the display device 330 based on the baseline light condition. For example, the display logic may determine display parameters for a color preset. The display logic may then generate the color preset to cause the display device 330 to meet the display parameters based on the calibrated linear light condition.

Figure 4:
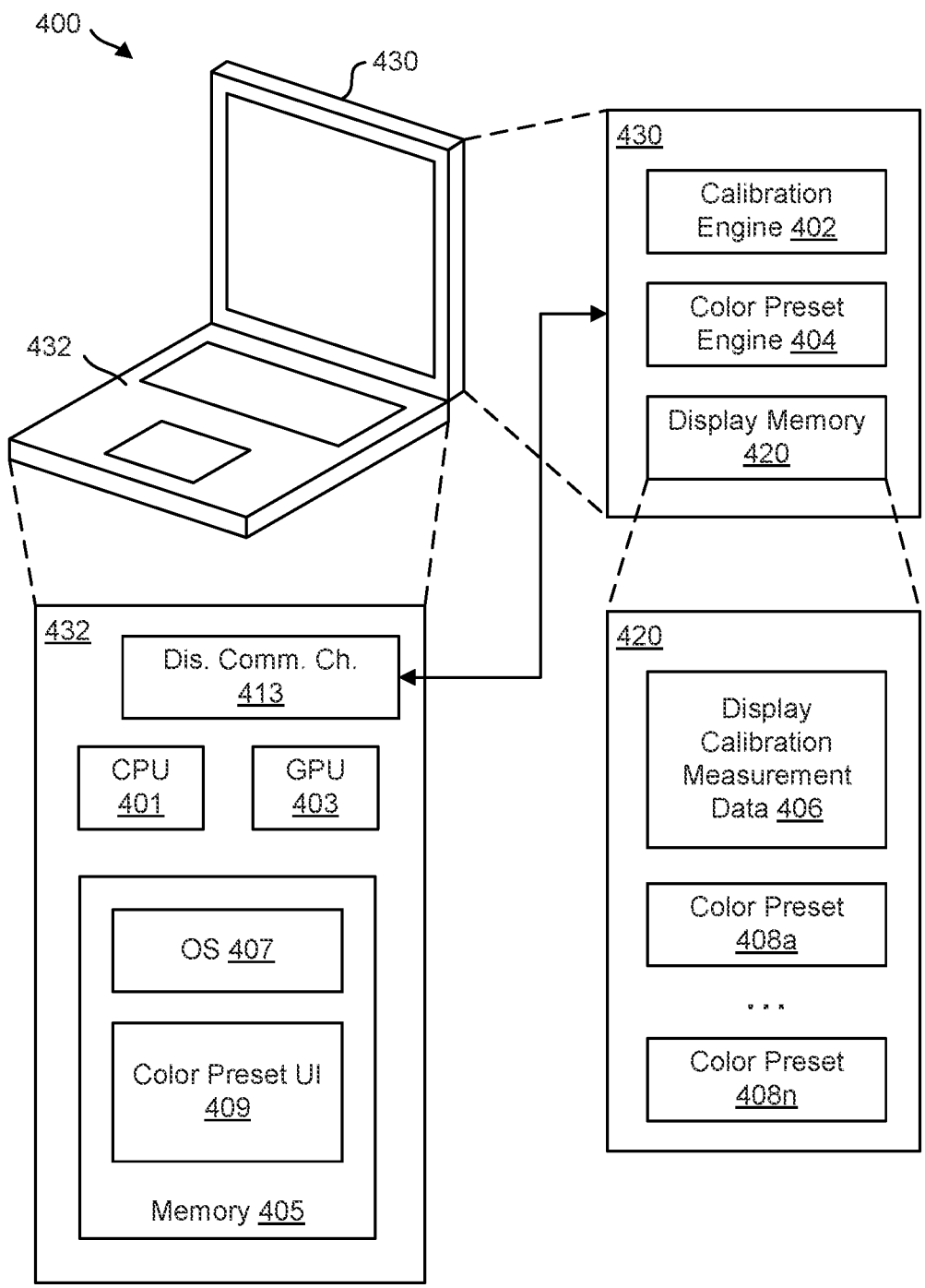
FIG. 4 depicts a computing system, according to an example.

FIG. 4 is an example computing system 400 depicted in the form of a laptop computer that includes a computing device 432 or "host" operably coupled with a display device 430. In this example, computing device 432 and display device 430 are integrated together as a single unit. As an example, the display device 430 can be, for instance, pivoted about various angles relative to computing device 432. In other examples, computing device 432 may be a standalone computing device such as a desktop tower, and the display device 430 may be a standalone display such as a computer monitor.

In yet other examples, computing system 400 may be formed as a tablet computer or an "all-in-one" computing system in which display device 430 and computing device 432 are integrated into a single unit. In yet other examples, computing system 400 in general and/or display device 430 in particular may take the form of a head-mounted display (HMD) that provides an augmented reality (AR) or virtual reality (VR) experience to a wearer.

As shown in the exploded portion at bottom left, computing device 432 may include logic in the form of a CPU 401 and GPU 403. In some examples, GPU 403 may be a "discrete" GPU that is separate and independent from CPU 401. In other examples, the functionalities of CPU 401 and GPU 403 may be combined into a single unit, such as a CPU with integrated graphics. CPU 401 and/or GPU 403 may be operably coupled with various types of memory, collectively represented by memory 405 in FIG. 4. Memory 405 may include, for instance, ROM, RAM, various types of non-volatile memory, etc.

Memory 405 may include, e.g., in the form of computer-executable instructions loaded in RAM from non-volatile memory, an operating system (OS) 407, a color preset user interface 409, and various applications that may execute on top of OS 407. Color preset user interface 409 may be a special application that receives user input to manually select display parameters for color presets 408a-n used on the display device 430. The user input may take various forms, such as user selection of a graphical element of a graphical user interface (GUI), a voice command, a gesture, etc. In other examples, color preset user interface 409 may be omitted, and configuration of the color presets 408a-n may be performed using source content metadata without the user being aware of the selection.

The computing device 432 may include other components. As examples, the computing device 432 may include input/output (I/O) interface(s) and a network interface card (NIC). I/O interface(s) may include, for instance, a keyboard, mouse, microphone, digital camera, etc.

In some examples, a display communication channel(s) 413 may be part of the I/O interface(s), although it is depicted separately in FIG. 4. Display communication channel(s) may take various forms, such as Video Graphics Array (VGA), Digital Visual Interface (DVI), High-Definition Multimedia Interface (HDMI), DisplayPort (DP) and/or Embedded DisplayPort (eDP), Low-Voltage Differential Signaling (LVDS), V-by-One, Universal Serial Bus (USB), Display Data Channel Connection Interface (DOC/CI), Inter-Integrated Channel (12C), Auxiliary Interface (AUX), etc. As shown in FIG. 4, display communication channel(s) 413 may operably couple the computing device 432 with display device 430.

As described above, the display device 430 may include logic (such as a calibration engine 402 and a color preset engine 404 that are the same as the calibration engine 102 and the color preset engine 104 of FIG. 1) and display memory 420. The logic (e.g., calibration engine 402 and color preset engine 404) and display memory 420 may be implemented as described in FIG. 3.

Figure 5:
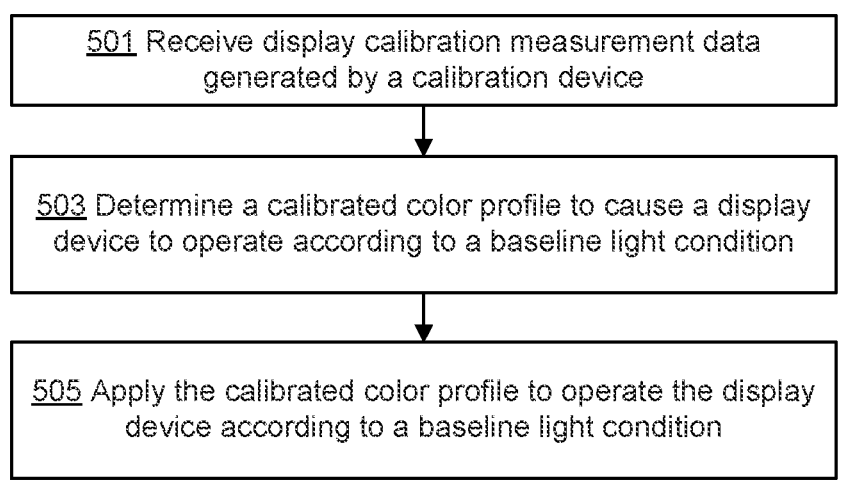
FIG. 5 illustrates a flow diagram depicting a method for calibrating a display device, according to an example.

FIG. 5 illustrates a flow diagram depicting a method 500 for calibrating a display device, according to an example. The method 500 may be performed by a calibration engine, such as a calibration engine 102 of FIG. 1.

At 501, display calibration measurement data is received. For example, a processor resource may receive the display calibration measurement data from a calibration device that measures the light emitted by a display device.

At 503, a calibrated color profile may be determined to cause the display device to operate according to a baseline light condition. For example, a processor resource may determine the calibrated color profile based on the display calibration measurement data. In some examples, the baseline light condition may be a linear light condition.

At 505, the display device may apply the calibrated color profile to operate according to a baseline light condition. For example, a processor resource may adjust the color pipeline of the display device to operate according to the calibrated color profile.

Figure 6:
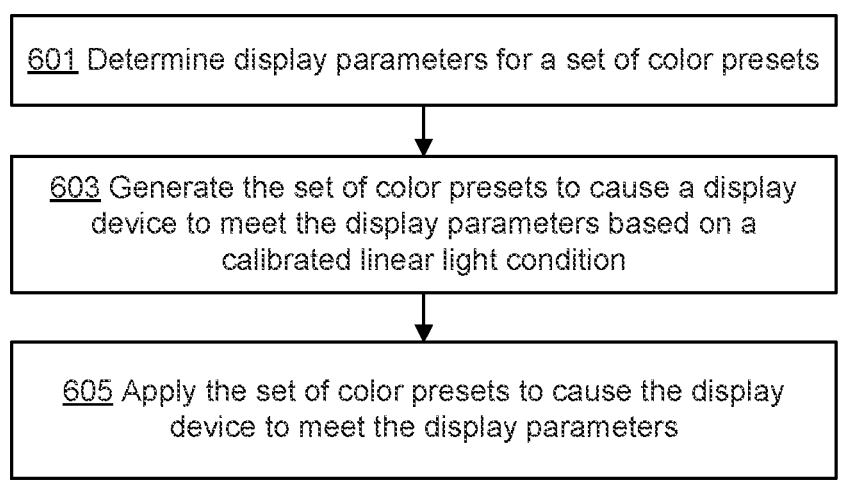
FIG. 6 illustrates a flow diagram depicting a method for generating color presets for a display device, according to an example.

FIG. 6 illustrates a flow diagram depicting a method 600 for generating color presets for a display device, according to an example. The method 600 may be performed by a color preset engine, such as a color preset engine 104 of FIG. 1.

At 601, display parameters for a set of color presets are determined. For example, a processor resource may receive a file that includes the display parameters. In some examples, the display parameters for a given color preset may include a specific white point, a set of RGB primaries, an electro-optical transfer function (EOTF), and a specific front-of-screen luminance.

At 603, the set of color presets may be generated to cause the display device to meet the display parameters based on a calibrated linear light condition. For example, a processor resource may determine a lookup table or a set of lookup tables to convert the linear light condition to meet the display parameters. In some examples, the processor resource may generate a lookup table or a set of lookup tables for each color preset in the set of color presets.

In some examples, the set of color presets comprises a user-configurable number of color presets. For example, the display parameters may include a user-defined number of color presets.

At 605, the display device may apply the set of color presets. For example, a processor resource may adjust the color pipeline of the display device according to the lookup table or multiple lookup tables representing color corrections between the linear light condition and the display parameters. In some examples, the processor resource may receive an acknowledgement from the display device in response to the display device applying the set of color presets.

In some examples, the display parameters for the set of color presets may be sent to multiple display devices calibrated with a linear light condition. For example, a file that includes the display parameters may be sent to the multiple display devices. The set of color presets may cause the multiple display devices to meet the display parameters based on the calibrated linear light condition.

Figure 7:
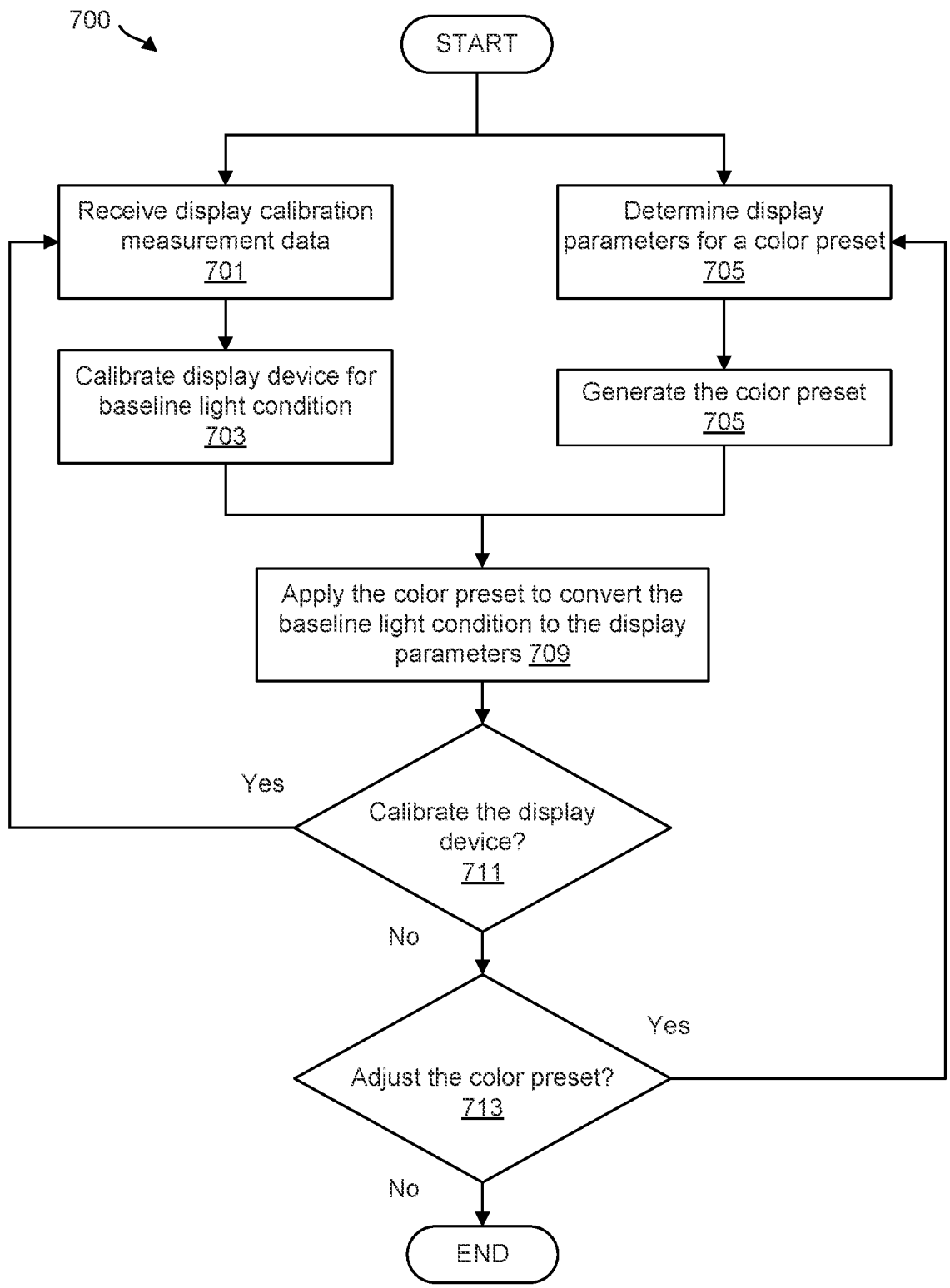
FIG. 7 illustrates a flow diagram depicting a method for calibrating a display device and generating a color preset for the display device, according to an example.

FIG. 7 illustrates a flow diagram depicting a method 700 for calibrating a display device and generating a color preset for the display device, according to an example. The method 700 may be performed by the calibration engine and the color preset engine, such as the calibration engine 102 and the color preset engine 104 of FIG. 1.

At 701, display calibration measurement data is received. For example, the calibration engine may receive the display calibration measurement data from a calibration device that measures light emitted by a display device.

At 703, the display device may be calibrated to cause the display device to operate according to a baseline light condition. In some examples, the baseline light condition may be a linear light condition. In some examples, the calibration engine may determine a calibrated color profile that includes an LUT or multiple LUTs to cause the display device to operate in the baseline light condition. Blocks 701 and 703 may include a calibration process for the display device.

At 705, display parameters for a color preset are determined. For example, the color preset engine may receive a file that includes the display parameters.

At 707, a color preset may be generated to cause the display device to meet the display parameters based on a calibrated baseline light condition. For example, the color preset engine may determine a lookup table or a set of lookup tables to convert the baseline light condition (e.g., linear light condition) to meet the display parameters.

Blocks 705 and 707 may include a color preset generation process. It should be noted that the calibration process may occur independent of the color preset generation process. For example, a display device may be calibrated to operate in a baseline light condition without impacting the color preset. Furthermore, the color preset may be generated based on an assumption that the display device will operate in the baseline light condition. Therefore, the color preset may be generated without measuring the light output of the display device.

At 709, the color preset may be determined to convert the baseline light condition of the display device to the display parameters. For example, the color pipeline of the display device may be adjusted according to the lookup tables representing color corrections between the baseline light condition and the display parameters.

At 711, a determination may be made to calibrate the display device. If the display device is to be calibrated, 711 determination YES, then the measurements of the display device may be made at 701. It should be noted that the calibration of the display device may occur without impacting the color preset. In other words, the same color preset determined at 707 may be applied at 709 after recalibrating the display device.

If the display device is not to be calibrated, 711 determination NO, then, at 713 a determination may be made to adjust the color preset. If the color preset is to be adjusted, 713 determination YES, then adjusted display parameters for the color preset may be determined at 705. It should be noted that the adjustment of the color preset may occur without performing calibration measurements of the display device. In some examples, the adjustment to the color preset may include adding or removing a number of color presets from a set of color presets. If the color preset is not to be adjusted, 713 determination NO, then method 700 may end.

Figure 8:
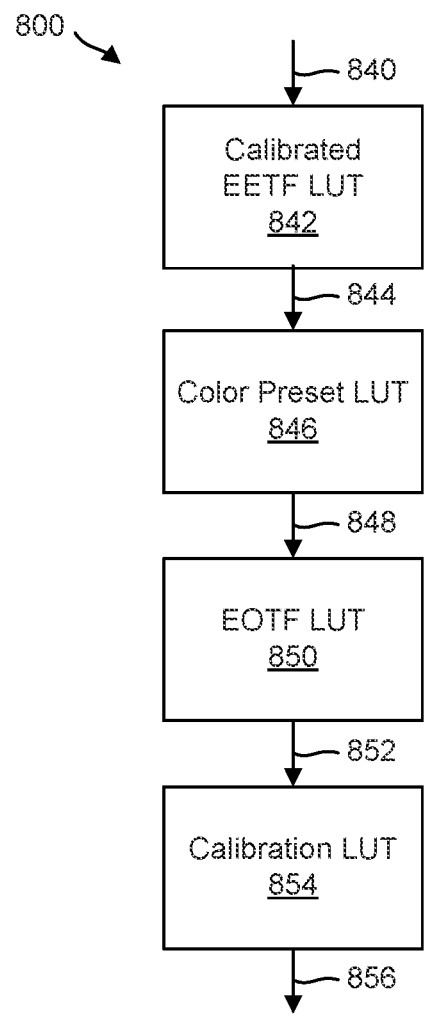
FIG. 8 is a block diagram illustrating a color pipeline of a display device, according to an example.

FIG. 8 is a block diagram illustrating a color pipeline 800 of a display device, according to an example. A gamma-corrected input signal 840 may be received at a display device. A calibrated electrical-electrical transfer function (EETF) LUT 842 may be applied to the input signal 840, converting the input signal 840 to a linear light signal 844. The calibrated EETF LUT 842 may be an example of the LUT generated by the calibration process described herein.

While in the linear light condition, a color preset LUT 846 (or multiple color preset LUTs) may be applied to the linear light signal 844 to modify the color characteristics of the linear light signal 844. In some examples, the color modifications may include gamut reduction, RGB primary manipulation, white point shifting, and so on. The color preset LUT 846 may be an example of the generate color preset described herein. The color preset LUT 846 may output a modified linear light signal 848. It should be noted that the color preset LUT 846 may be generated without actual knowledge of the state of the display device because a linear light condition is created by the calibrated EETF LUT 842.

At the end of the linear light condition, an electro-optical transfer function (EOTF) LUT 850 may be applied to the modified linear light signal 848 to convert the modified linear light signal 848 back to a gamma-corrected signal 852 used for display on the display device.

In some examples, another calibration LUT 854 may be applied to the gamma-corrected signal 852 to produce the output image signal 856. In some examples, the calibration LUT 854 may be generated during calibration to adjust the display device to account for inconsistent performance of the display device.

What is claimed is:

1. An electronic device, comprising:
   a calibration engine to:
     receive display calibration measurement data generated by a calibration device for a display device; and
     determine a calibrated color profile to cause the display device to operate according to a baseline light condition based on the display calibration measurement data; and
   a color preset engine to:
     generate a color preset for the display device based on the baseline light condition,
   wherein the baseline light condition comprises a linear light condition for the display device.

2. The electronic device of claim 1, wherein the color preset engine is to:
   determine display parameters for the color preset.

3. The electronic device of claim 2, wherein the display parameters for the color preset comprise a specific white point, a set of RGB primaries, an electro-optical transfer function (EOTF), and a specific front-of-screen luminance.

4. The electronic device of claim 2, wherein the color preset engine is to:
   determine a color preset mapping to convert the baseline light condition to meet the display parameters for the color preset.

5. The electronic device of claim 4, wherein the color preset mapping comprises a lookup table or a set of lookup tables.

6. The electronic device of claim 2, wherein the generated color preset is a color pipeline configuration having a lookup table or multiple lookup tables representing color corrections between the baseline light condition and the display parameters.

7. The electronic device of claim 1, wherein the linear light condition is a state of the display device in which an image signal is not gamma corrected.

8. A non-transitory computer-readable storage medium comprising a set of instructions executable by a processor resource to:
- calibrate a display device to operate according to a linear light condition;
- determine display parameters for a color preset; and
- generate the color preset to cause the display device to meet the display parameters based on the linear light condition.

9. The non-transitory computer-readable storage medium of claim 8, wherein the set of instructions is executable by the processor resource to:
- determine display parameters for multiple color presets; and
- generate the multiple color presets to cause the display device to meet the display parameters for the multiple color presets based on the linear light condition.

10. The non-transitory computer-readable storage medium of claim 8, wherein calibration of the display device is independent of color preset generation.

11. The non-transitory computer-readable storage medium of claim 8, wherein the linear light condition is a state of the display device in which an image signal is not gamma corrected.

12. A method, comprising:
- determining display parameters for a set of color presets for a display device;
- sending the display parameters for the set of color presets to multiple display devices calibrated with a linear light condition;
- generating the set of color presets to cause the display device to meet the display parameters based on a calibrated linear light condition; and
- applying the set of color presets on the multiple display devices,
- wherein the set of color presets cause the multiple display devices to meet the display parameters based on the calibrated linear light condition.

13. The method of claim 12, wherein the set of color presets comprises a user-configurable number of color presets.

14. The method of claim 12, further comprising receiving an acknowledgement from the display device in response to the display device applying the set of color presets.

15. The method of claim 12, further comprising formatting the display parameters for the set of color presets in a human-readable file format.

16. The method of claim 12, wherein the linear light condition is a state of the display device in which an image signal is not gamma corrected.

* * * * *